Jan. 20, 1953 J. E. BRANDENBERGER 2,625,776
APPARATUS FOR THE PRODUCTION OF WRAPPED ARTICLES
Filed Oct. 23, 1950 4 Sheets-Sheet 1
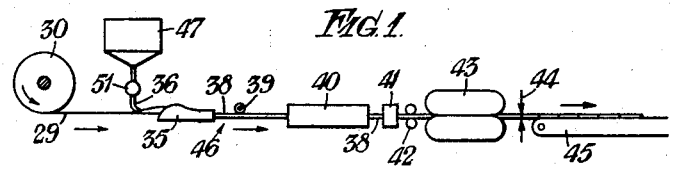
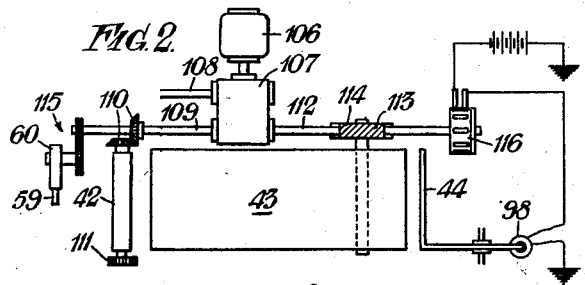
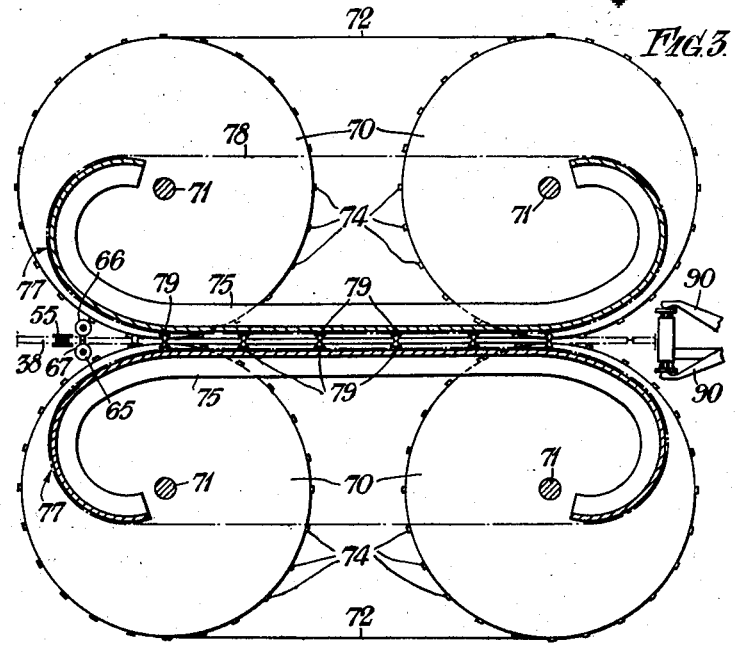
Inventor
Jacques Edwin Brandenberger
By
Atty.

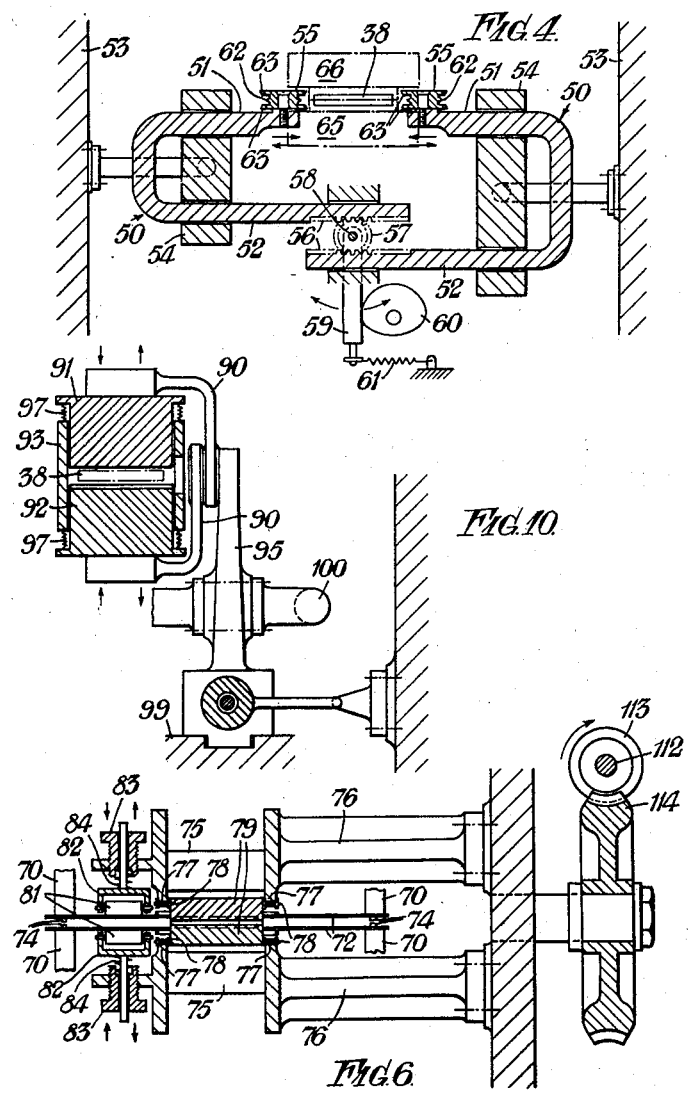

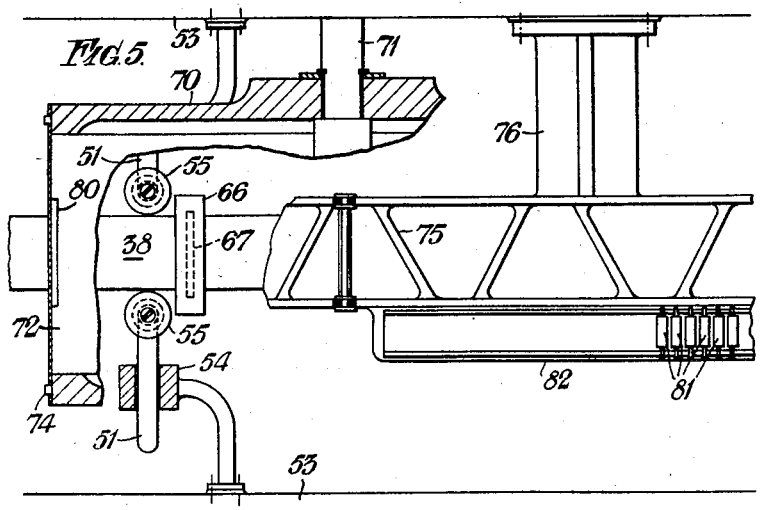
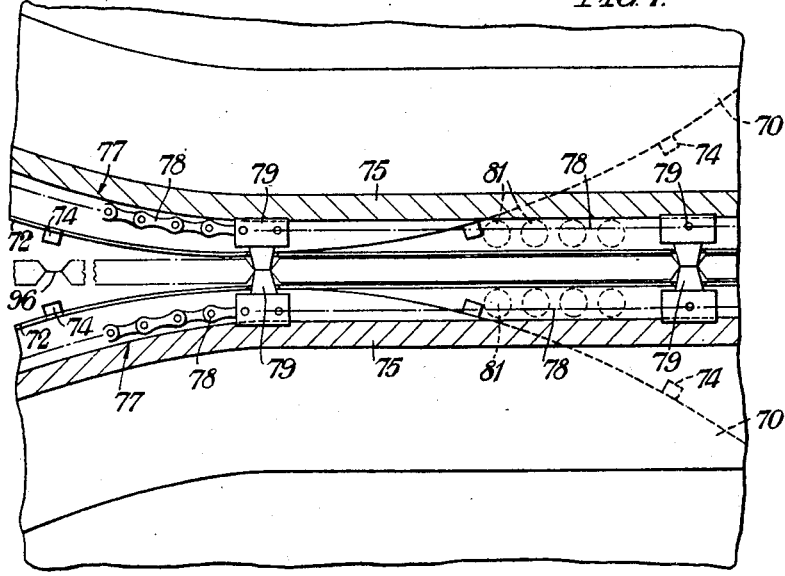

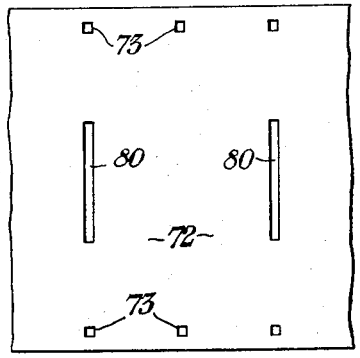
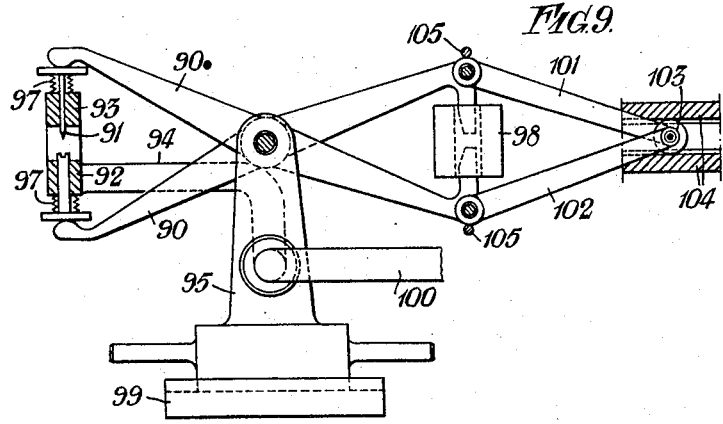

Patented Jan. 20, 1953

2,625,776

UNITED STATES PATENT OFFICE 2,625,776

APPARATUS FOR THE PRODUCTION OF WRAPPED ARTICLES

Jacques Edwin Brandenberger, Paris, France, assignor to Societe La Cellophane (Suisse), Basle, Switzerland, a corporate body of Switzerland Application October 23, 1950, Serial No. 191,567
In Great Britain November 9, 1949

14 Claims. (Cl. 53—55)

This invention concerns apparatus for producing wrapped articles of a thermoplastic nature and relates more particularly to the automatic and continuous production of wrapped bars of chocolate.

The present invention relates to certain improvements in the apparatus described in U. S. patent application Serial No. 131,683, now Patent 2,578,626, December 11, 1951. The apparatus described in said application is used, more particularly for making bars of high-grade chocolate and comprises means for continuously folding the longitudinal edges of a moving strip around a former to make a flexible tube, means for continuously filling the moving tube with the chocolate material in a plastic state so that a band of the filled tube of a generally flat cross-section is produced, smoothing elements to press continuously on the flat surfaces of the band of chocolate whereby surface irregularities and occluded air are removed and the band is given a regular cross-sectional shape, means for cooling the smoothed band of chocolate and means for indenting, pressing, smoothing and cutting the band to produce wrapped chocolate bars of uniform density, smooth surface, regular shape and standard weight.

The object of this invention is to provide in an apparatus as above set forth an improved construction of indenting mechanism.

Another object is the provision of an indenting mechanism of small bulk and length so that the floor space occupied by the apparatus is kept low.

A further object is the provision of an indenting mechanism comprising a relatively small number of simple parts of robust construction so that maintenance and repair of the mechanism are small.

Yet a further object is to ensure that the mechanism is economical in its use of power to drive it.

Other objects of the invention are concerned with the provision of a smoothing mechanism and a cutting mechanism of simple construction.

The preferred construction of the indenting, smoothing and cutting mechanisms according to this invention will now be described, by way of example only, with reference to the accompanying drawings whereof:

Figure 1 is a schematic view of the complete apparatus incorporating the indenting, smoothing and cutting mechanisms in accordance with this invention.

Figure 2 is a diagrammatic view of the driving means for the various mechanisms.

Figure 3 is a side view, partly in section, showing the indenting, smoothing and cutting mechanisms.

Figure 4 is a transverse cross-section of the indenting mechanism.

Figure 5 is a plan view, partly in section, of certain portions of the indenting and smoothing mechanisms.

Figure 6 is a transverse cross-section of the smoothing mechanism.

Figure 7 is a side view, partly in section and to a larger size, of a portion of the smoothing mechanism shown in Figure 3.

Figure 8 is a plan view of a part of the ribbon of the smoothing mechanism.

Figure 9 is a side view, partly in section, of the cutting mechanism, and

Figure 10 is an end view, partly in section, of the mechanism of Figure 9.

Referring to Figure 1 of the drawings; a strip 29 of wrapping material is continuously drawn from a supply roll 30 over any known or convenient tensioning means (not shown) and the strip is fed into a folding device 35 where it is wrapped over a nozzle 36. The nozzle is flat and discharges a flat ribbon of chocolate on to the strip, the width of the chocolate ribbon being approximately equal to the distance between the folded up edges of the strip. The edges of the strip are folded over on top of the nozzle and are engaged therein by a roller (not shown) as described in the specification to application Serial No. 131,683, now Patent 2,578,626, December 11, 1951, to seal the edges of the strip and form a tube. The tube is filled with chocolate by nozzle 36, while the chocolate is warm and plastic, the chocolate being delivered thereto by a pump 51 from a hopper 47. In this way a band of chocolate 38 is produced in a continuous manner.

The band of chocolate passes beneath an equalising roller 39 while supported on a plate 46 so that its final shape, after leaving the roller 39, is uniform, of constant density and has a smooth surface.

From roller 39 the band is led through a cooler 40 (in the form of a long, straight tunnel) and is then delivered to an indenting mechanism 41, pressing mechanism 42, a smoothing mechanism 43, cutting mechanism 44 and so to a conveyor 45 which receives the finished bars of chocolate.

The chocolate delivered to the tube may be plain, milk or other chocolate alone or a chocolate and centre may be supplied at the same time through concentric nozzles from separate hoppers each by a pump both of which are simultaneously controlled to deliver a required proportion of filling and chocolate.

The wrapping material 29 may be regenerated cellulose foil which is coated with various cellulose derivatives, gums, resins and waxes and is preferably a lamination of regenerated cellulose foil with metal foil. The lamination has a thin thermoplastic coat on its outer surface, for example, of nitro cellulose. The coat acts to waterproof the foil and adhesion between the overlapped portions of the foil of the tube can then be affected merely by the application of heat and gentle pressure.

The band of chocolate 38 leaving cooler 40 is continuously subjected to a series of operations whereby individual bars of chocolate are produced, each of which is completely enveloped by the tube material. These operations will now be described in detail.

The band from cooler 40 is conveyed to the indenting mechanism 41 which comprises a pair of U-shaped members, generally indicated at 50, of which the limbs 51, 52 are suitably supported from a frame 53 so that they can slide in bearing blocks 54, limb 51 being above limb 52. The limbs 51 constitute the arms referred to previously and are spaced apart in the same horizontal plane. At the free end of each limb 51 there is a roller 55 having a W-section rim, the rollers being freely rotatable on their limbs. As is clear from Figure 4 the band of chocolate 38 travels between the rollers.

The free ends of limbs 52 overlap and lie one above the other and their adjacent sides are formed as racks 56. A common pinion 57 lies between and meshes with the racks, the pinion being mounted for oscillation on a shaft 58 by an arm 59 which is displaced in one direction by cam 60 and returned by spring 61, the cam being driven as later described.

The indenting of the opposite edges of the band is done by the central limbs 62 of the rollers 55, the outer limbs 63 passing, one over and the other under, the band and prevent or minimize the spread of chocolate upwardly and downwardly during the operation.

The indenting operation is performed as the band is moving forward, the freely-rotating rollers 55 allowing this to be done without excessive drag on the moving band.

The length of the indenting mechanism i. e. its extent in the direction of movement of the band, is small and being of simple and robust construction requires small power for its operation. As a result of its simplicity and robustness it requires little supervision.

The indented band is delivered to the pressing mechanism 42 comprising a pair of rollers 65, 66 each having a single flat-topped ridge 67 arranged so that the flat tops engage each other as the rollers are driven (see Figs. 3, 4 and 5). The ridges 67 press the surfaces of the band which have been flattened in passing under roller 39 closely together to form a closure strip 96 (Fig. 7).

This pressing operation, if performed without indenting the band in mechanism 41, results in its width being locally increased at the closure strip 96. The indentations at the opposite edges of the band, however, carry the tube material inwardly so that this material is not available to increase locally the width of the band so that after the pressing operation the width of the band is maintained substantially constant.

Chocolate will be displaced within the tube during the indenting and pressing operations and will raise the flattened surfaces of the band near the closure strips 96. Accordingly the band is delivered to the smoothing mechanism 43 to disperse the chocolate at said raised positions.

Mechanism 43 (see particularly Figs. 3, 5, 6 and 7) comprises four drums 70 which are arranged in pairs, one above the other, the drums being supported on shafts 71 from the machine frame 53 and being driven as later described. Passing around the upper pair of drums is an endless ribbon 72 which is preferably of steel and has holes 73 (Fig. 8) along both edges to be engaged by pins 74 projecting from the drums so that the ribbon is driven by the drums without slip. A similar ribbon arrangement is provided for the lower pair of drums (Fig. 3).

Associated with the drums is a pair of guide frames 75 which are supported cantileverwise by members 76 from the frame 53 (Fig. 6). The frames 75 lie one above the other and each has a pair of mainly horizontal guide surfaces 77 which are spaced apart transversely of the ribbons. Supported by each surface 77 of each guide frame is a chain 78, the chains associated with each guide frame being connected together by pressing bars 79 which extend transversely of the ribbons 72. The upper and lower guide surfaces 77 gradually approach each other so that the pressing bars 79 are pushed together, and being arranged in pairs, they are adapted to engage and press a closure strip 96 between them.

The ribbons 72 travel in the direction of the band of chocolate one on each side of it and the ribbons lie between the band of chocolate and the chains 78. The ribbons have transverse slots 80 spaced centrally along their length to receive the bars 79 so that these may project through the ribbons to engage the strips 96 of the band 38.

The upper and lower guide frames 75 carry on their outer sides (see Fig. 6) a series of rollers 81 (Fig. 6) which are arranged in two rows on the channel members 82 that are adjustable towards and away from each other by nuts 83, the members 82 being resiliently supported by springs 84. The rollers 81 engage along one side of the ribbons 72 and are provided to limit the distance the ribbons may separate as they travel along with the band of chocolate between them—this distance being variable by adjusting nuts 83.

As will be apparent from Fig. 6, the chocolate band 38 is fed between the ribbons 72 and travels through the mechanism 43 between them. As the ribbons move along with the band 38 the rollers 81 are set by suitable adjustment of the nuts 83 gradually increase the pressure of the ribbons on the band to squeeze the band between them. After the band 38 has entered between the ribbons the bars 79 engage, through the ribbon, opposite sides of each closure strip 96. The pressure of the bars on the strips is determined by the guide surfaces 77 but in any case it is such as to prevent chocolate being forced back into the space occupied by the strips by the smoothing operation performed by ribbons 72.

It will be noted in Fig. 3 that the guide frames 75 are outwardly flared at both ends smoothly to carry the bars 79 into engagement with, and away from, the ribbons.

The abutting faces of bars 79 may be faced with rubber.

The cutting operation is performed on the band at the delivery end of the smoothing mechanism 43. The cutting mechanism 44 is illustrated in Figs. 3, 9 and 10 to which reference should now be made.

The mechanism 44 comprises a pair of scissors arms 90 which engage at one end a pair of cutting elements 91, 92 (respectively a knife and a co-operating block) which are supported in a frame 93. The latter is carried by an arm 94 from a pillar 95. The knife and block are urged apart by springs 97 and are movable towards each other to cut the closure strip lengthwise into substantially two equal portions. The other end of the arms 90 enter a common solenoid 98 which when energised closes the arms to perform the cutting stroke. When the solenoid is de-energised the arms are spring-returned to open.

The pillar 95 is slidably supported on a base 99 and is reciprocated by lever 100 so that during the cutting operation the arms are moved forward with the band 38 and are then returned to engage the next succeeding closure strip. The reciprocating movements of pillar 95 are performed in timed relationship with the operation of the indenting and smoothing mechanism.

To ensure that both elements 91, 92 engage opposite sides of the closure strip at the same time the solenoid arms form part of a parallelogram linkage having two levers 101, 102 which carry a roller 103 at their point of intersection (Fig. 9) the roller being constrained by guides 104 to move along a path which at all times bisects the angle between arms 90.

Stops 105 are provided to limit the extent of opening of the arms 90.

Reverting now to Fig. 2:

The various mechanisms described are driven by an electric motor 106 through a gear box 107. Thus, the pump 51 is driven from shaft 108, the pressing mechanism 42 from shaft 109 through gear train 110, the rollers of the mechanism being geared together at 111, and a pair of the drums 70 of mechanism 43 from shaft 112 through worm gearing 113, 114. The cam 60 of mechanism 41 is driven from shaft 109 through gear train 115. The cutting mechanism 44 is also operated in synchronism with the other mechanisms of the apparatus and to this end a rotary switch 116 is driven by shaft 112, the switch being connected with solenoid 98 so that it is energised in timed relationship with the movement of the band of chocolate through the apparatus.

It is to be understood that the various devices described are diagrammatically illustrated in Fig. 2.

The cut and wrapped bars are carried away by conveyor 45.

I claim:

1. In an apparatus for making bars of high-grade chocolate of the class comprising means for continuously folding the longitudinal edges of a moving strip around a former to make a flexible tube, means for continuously filling the moving tube with the chocolate material in a plastic state so that a band of the filled tube of a generally flat cross-section is produced, equalizing elements to press continuously on the flat top and bottom surfaces of the band of chocolate whereby surface irregularities and occluded air are removed and the band is given a regular cross-sectional shape, means for cooling the smoothed band of chocolate and means for indenting, pressing, smoothing and cutting the band to produce wrapped chocolate bars of uniform density, smooth surface, regular shape and standard weight, the provision of an indenting mechanism comprising a pair of spaced-apart arms between which the band of chocolate is adapted to pass, means to move the arms towards and away from the opposite side edges of the band of chocolate, a connection between the arms constraining them to move together both towards and away from the band and to the same extent and an indenting means carried by each arm to engage the opposite side edges of the band and form grooves therein.

2. Apparatus according to claim 1 wherein the indenting means comprises a roller having a W-section rim having outer flanges adapted to lie on the top and bottom surfaces of the band of chocolate and having a central flange forming said groove in said band.

3. Apparatus as claimed in claim 2 wherein each roller is carried by a leg of a U-shaped member, the other legs of both members being drivingly connected together.

4. Apparatus as claimed in claim 3 in which the driving legs of both members comprise racks which mesh with a common pinion.

5. Apparatus as claimed in claim 4 in which the pinion is actuated by a cam-operated arm.

6. Apparatus as claimed in claim 1 in which the band of chocolate is delivered from the indenting mechanism to a pressing mechanism where the band is subdivided into connected bars by closure strips formed transversely of the band.

7. In an apparatus for making bars of high grade chocolate of the class comprising means for continuously folding the longitudinal edges of a moving strip around a former to make a flexible tube, means for continuously filling the moving tube with the chocolate material in a plastic state so that a band of the filled tube of a generally flat cross-section is produced, equalizing elements to press continuously on the flat top and bottom surfaces of the band of chocolate whereby surface irregularities and occluded air are removed and the band is given a regular cross-sectional shape, means for cooling the smoothed band of chocolate and means for indenting, pressing, smoothing and cutting the band to produce wrapped chocolate bars of uniform density, smooth surface, regular shape and standard weight, smoothing mechanism comprising a pair of flat ribbons, a chain of pressing members, of which the ribbons and chain both travel forward with the band of chocolate, and means for applying the ribbons to the surface of the band and the pressing members to the closure strips of that part of the band which is engaged by the ribbons, the latter being transversely slotted to allow the pressing members to pass through the ribbons and engage the closure strips.

8. Apparatus as claimed in claim 7 wherein the endless ribbons pass over drums by which they are driven, the ribbons being brought close together to travel along parallel paths between which the chocolate band lies and the pressing members are carried by endless chains which travel one behind each ribbon with its members projecting through the ribbon.

9. Apparatus as claimed in claim 8 wherein the chains of pressing members are driven by the ribbons through the agency of the projecting members.

10. Apparatus as claimed in claim 9 in which the path followed by the chain of pressing members is less than the ribbon path, the chains and ribbons being in driving connection during the smoothing operation.

11. Apparatus according to claim 10 in which the chains travel over guide frames which carry the chains into, and out of, driving connection with the ribbons respectively immediately before and after the smoothing operation.

12. Apparatus as claimed in claim 11 in which the distance between the portions of the flat ribbon which engage the band of chocolate is adjustable.

13. Apparatus as claimed in claim 12 wherein the adjusting means comprises a set of rollers to engage each ribbon and means to adjust the sets of rollers towards and away from each other.

14. In an apparatus for making bars of high-grade chocolate of the class comprising means for continuously folding the longitudinal edges of a moving strip around a former to make a flexible tube, means for continuously filling the moving tube with the chocolate material in a plastic state so that a band of the filled tube of a generally flat cross-section is produced, equalizing elements to press continuously on the flat top and bottom surfaces of the band of chocolate whereby surface irregularities and occluded air are removed and the band is given a regular cross-sectional shape, means for cooling the smoothed band of chocolate and means for indenting, pressing, smoothing and cutting the band to produce wrapped chocolate bars of uniform density, smooth surface, regular shape and standard weight, said means for cutting the band of chocolate delivered from the smoothing mechanism comprising a mechanism which moves forward with the band and comprises a pair of scissor arms which carry at one end a pair of cutting elements which are movable towards each other to cut the closure strip lengthwise substantially into halves, said scissor arms forming part of a parallelogram linkage which is constrained to ensure that both cutting elements engage the closure strip at the same time.

JACQUES EDWIN BRANDENBERGER.

REFERENCES CITED

The following references are of record in the file of this patent:

UNITED STATES PATENTS

| Number | Name | Date |
| --- | --- | --- |
| 1,373,533 | Slingluff | Apr. 5, 1921 |
| 1,810,740 | Vogt | June 16, 1931 |
| 1,810,862 | Vogt | June 16, 1931 |
| 2,027,545 | Mapes | Jan. 14, 1936 |
| 2,142,505 | Gammeter | Jan. 3, 1939 |
| 2,156,466 | Vogt | May 2, 1939 |
| 2,340,260 | Clunan | Jan. 25, 1944 |
| 2,420,983 | Salfisberg | May 20, 1947 |
| 2,505,603 | Brandenberger | Apr. 25, 1950 |

FOREIGN PATENTS

| Number | Country | Date |
| --- | --- | --- |
| 14,594 | Great Britain | June 16, 1910 |
| 472,874 | Great Britain | Oct. 1, 1937 |